(12) United States Patent
Masuda

(10) Patent No.: US 9,789,781 B2
(45) Date of Patent: Oct. 17, 2017

(54) CHARGING DEVICE FOR A VEHICLE MOUNTED ELECTRICAL STORAGE DEVICE

(71) Applicant: Tomokazu Masuda, Kasugai (JP)

(72) Inventor: Tomokazu Masuda, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 205 days.

(21) Appl. No.: 14/765,653

(22) PCT Filed: Jan. 31, 2014

(86) PCT No.: PCT/IB2014/000091
§ 371 (c)(1),
(2) Date: Aug. 4, 2015

(87) PCT Pub. No.: WO2014/132112
PCT Pub. Date: Sep. 4, 2014

(65) Prior Publication Data
US 2015/0375633 A1 Dec. 31, 2015

(30) Foreign Application Priority Data
Feb. 26, 2013 (JP) ................................. 2013-035605

(51) Int. Cl.
*H02J 7/00* (2006.01)
*B60L 11/18* (2006.01)
(Continued)

(52) U.S. Cl.
CPC ........... *B60L 11/1851* (2013.01); *B60L 3/003* (2013.01); *B60L 3/0069* (2013.01); *B60L 3/04* (2013.01);
(Continued)

(58) Field of Classification Search
USPC ......................................... 320/133, 135, 109
See application file for complete search history.

(56) References Cited

U.S. PATENT DOCUMENTS

| 2004/0113591 A1* | 6/2004 | Bradley | ................ H02J 7/0093 320/133 |
| 2010/0174667 A1* | 7/2010 | Vitale | ................... B60L 3/0069 705/412 |

(Continued)

FOREIGN PATENT DOCUMENTS

| JP | 2010-142026 A | 6/2010 |
| JP | 2012-070623 A | 4/2012 |

(Continued)

*Primary Examiner* — Samuel Berhanu
(74) *Attorney, Agent, or Firm* — Oliff PLC

(57) ABSTRACT

A charging device for a vehicle carries out timer charging in which the charging device is set in a standby state without charging until charging start time comes when the charging start time is set for a vehicle-mounted electrical storage device. The charging device for the vehicle includes a charger that charges the electrical storage device with electric power supplied from a device outside the vehicle, and an ECU that determines whether to carry out timer charging or carry out instant charging without carrying out the timer charging on the basis of a state of a switch associated with an open/close state of a charging lid, and that controls the charger. Desirably, a timer cancellation or determination switch is also used as a switch for detecting the open/close state of the lid or a switch for opening the lid.

10 Claims, 15 Drawing Sheets

(51) Int. Cl.
    *H01H 13/14*     (2006.01)
    *B60L 3/00*     (2006.01)
    *B60L 3/04*     (2006.01)
    *B60L 7/14*     (2006.01)
    *B60L 11/12*     (2006.01)
    *B60L 11/14*     (2006.01)
    *B60L 15/00*     (2006.01)
    *B60L 15/20*     (2006.01)

(52) U.S. Cl.
    CPC ............... *B60L 7/14* (2013.01); *B60L 11/123* (2013.01); *B60L 11/14* (2013.01); *B60L 11/1812* (2013.01); *B60L 11/1816* (2013.01); *B60L 11/1818* (2013.01); *B60L 11/1844* (2013.01); *B60L 11/1846* (2013.01); *B60L 11/1848* (2013.01); *B60L 11/1861* (2013.01); *B60L 11/1864* (2013.01); *B60L 11/1877* (2013.01); *B60L 15/007* (2013.01); *B60L 15/2009* (2013.01); *H01H 13/14* (2013.01); *B60L 2210/10* (2013.01); *B60L 2210/40* (2013.01); *B60L 2220/14* (2013.01); *B60L 2240/12* (2013.01); *B60L 2240/421* (2013.01); *B60L 2240/441* (2013.01); *B60L 2240/527* (2013.01); *B60L 2240/529* (2013.01); *B60L 2240/80* (2013.01); *B60L 2250/10* (2013.01); *B60L 2250/16* (2013.01); *B60L 2270/145* (2013.01); *B60L 2270/20* (2013.01); *Y02E 60/721* (2013.01); *Y02T 10/6217* (2013.01); *Y02T 10/645* (2013.01); *Y02T 10/7005* (2013.01); *Y02T 10/7044* (2013.01); *Y02T 10/7061* (2013.01); *Y02T 10/7072* (2013.01); *Y02T 10/7077* (2013.01); *Y02T 10/7216* (2013.01); *Y02T 10/7241* (2013.01); *Y02T 10/7275* (2013.01); *Y02T 10/92* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

2012/0091958 A1     4/2012     Ichikawa et al.
2013/0184886 A1*    7/2013     Pollack .................. G05D 11/00
                                                                     700/291

FOREIGN PATENT DOCUMENTS

JP         2012-205361 A     10/2012
WO       2010/122647 A1     10/2010

* cited by examiner

<WHEN CONNECTOR IS NOT CONNECTED>

| STATE OF SWITCH | LID STATE DETERMINATION |
|---|---|
| ON | LID IS OPEN |
| OFF | LID IS CLOSED |

FIG. 8

<WHEN CONNECTOR IS CONNECTED>

| STATE OF SWITCH | TIMER DETERMINATION |
|---|---|
| ON | TIMER IS ENABLED |
| OFF (FOR EXAMPLE, 60 ms OR LONGER) | TIMER IS DISABLED (INSTANT CHARGING) |

FIG. 14

<WHEN CONNECTOR IS CONNECTED>

| STATE OF SWITCH | TIMER DETERMINATION |
|---|---|
| ON | TIMER SETTING IS DISABLED |
| OFF (FOR EXAMPLE, 60 ms OR LONGER) | TIMER SETTING IS ENABLED |

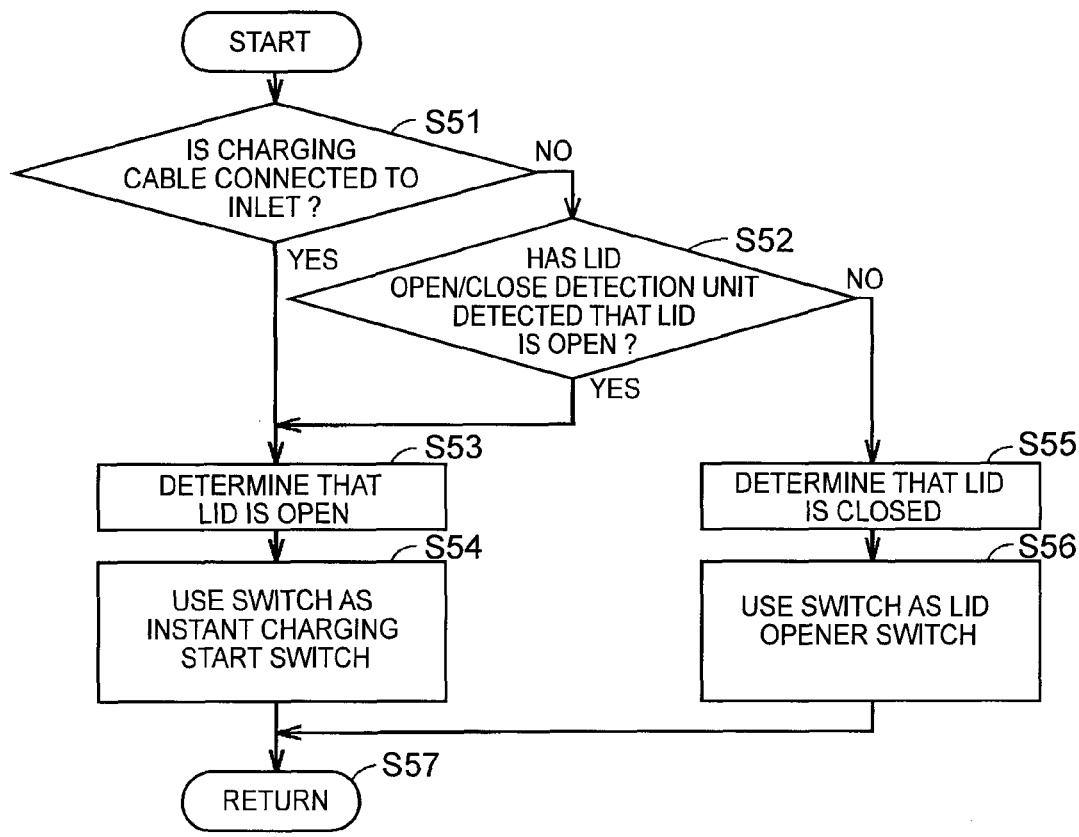

FIG. 21

| STATE OF SWITCH | WHEN SWITCH OPERATES AS TIMER DETERMINATION SWITCH | WHEN SWITCH OPERATES AS LID OPENER SWITCH |
|---|---|---|
| ON (60 ms OR LONGER) | ENABLE TIMER | LID IS OPENED |
| OFF | DISABLE TIMER | LID REMAINS CLOSED (LID IS NOT OPENED) |

US 9,789,781 B2

CHARGING DEVICE FOR A VEHICLE MOUNTED ELECTRICAL STORAGE DEVICE

BACKGROUND OF THE INVENTION

1. Field of the Invention

The invention relates to a charging device for a vehicle on which an electrical storage device is mounted and, more particularly, to a charging device for a vehicle, which carries out timer charging.

2. Description of Related Art

In recent years, vehicles, such as electric vehicles and plug-in hybrid vehicles, configured to be able to charge a vehicle-mounted electrical storage device from an external device have started being widely used.

Japanese Patent Application Publication No. 2012-70623 (JP 2012-70623 A) describes a control device for a vehicle, which is able to adjust a charging schedule for charging an electrical storage device from an external power supply.

An ECU mounted on the vehicle described in this publication includes a charge control unit that causes a battery to be charged by controlling a charger and a start-up command unit that, when charging start time is set, issues a start-up command to the charge control unit such that the charge control unit is caused to be set in a standby state until current time reaches the charging start time and to start charging the battery from the charging start time. When the start-up command unit has received a start command, the start-up command unit issues the start-up command to the charge control unit such that the battery starts being charged from the timing at which the start command has been received.

JP 2012-70623 A describes that the start-up command unit executes control such that the battery starts being charged from the timing at which the start command has been received when the start-up command unit has received the start command; however, it does not apparently describe the details of user's operation for issuing the start command to the start-up command unit.

It is presumable that a frequency at which a command for cancelling such timer reservation or a command for enabling timer reservation is given is extremely low depending on the way of user's usage. For example, a user who conducts normal charging without timer setting or a user who constantly conducts timer charging in accordance with timer setting extremely less frequently provides such a command.

Thus, the frequency at which an input switch for issuing a command is operated is also low, and the user is hard to realize an abnormality even when the switch has a failure. Therefore, in the case where the timer is set, when instant charging is intended by cancelling the timer setting; there is a concern that the timer setting cannot be cancelled and the instant charging cannot be carried out.

SUMMARY OF THE INVENTION

The invention provides a charging device for a vehicle, which increases the possibility that a failure on timer setting for charging is realized.

A first aspect of the invention provides a charging device for a vehicle, which carries out timer charging in which the charging device is set in a standby state without charging until charging start time comes when the charging start time is set for a vehicle-mounted electrical storage device. The charging device includes a charger and an electronic control unit. The charger is configured to charge the electrical storage device with electric power supplied from a device outside the vehicle. The electronic control unit is configured to determine whether to carry out the timer charging or carry out instant charging without carrying out the timer charging on the basis of a state of a switch associated with an open/close state of the charging lid, and the electronic control unit is configured to control the charger.

In the charging device, the switch may be configured to output a first signal when the charging lid is closed and to output the first signal and a second signal different from the first signal in response to user's operation when the charging lid is open. The electronic control unit may be configured to determine whether to carry out the timer charging on the basis of a signal that is output from the switch when the charging lid is open.

In the charging device, the switch may be a pushbutton switch, and a stroke of the pushbutton switch may be selectable between a long stroke and a short stroke.

In the charging device, an inlet to which a charging cable is connected may be accommodated inside the charging lid. The electronic control unit may be configured to use the switch as a switch for detecting the open/close state of the charging lid when the charging cable is not connected to the inlet, and the electronic control unit may use the switch as a timer cancellation switch when the charging cable is connected to the inlet.

In the charging device, an inlet to which a charging cable is connected may be accommodated inside the charging lid. The electronic control unit may be configured to use the switch as a switch for detecting the open/close state of the charging lid when the charging cable is not connected to the inlet, and the electronic control unit may be configured to use the switch as a timer determination switch when the charging cable is connected to the inlet.

In the charging device, the switch may be a momentary pushbutton switch. The pushbutton switch may be configured to contact the charging lid into a depressed state when the charging lid is closed. The pushbutton switch may be configured to be in a depression released state and in a state where a user is allowed to depress the pushbutton switch when the charging lid is open.

In the charging device, the switch may be configured to be operated in order to shift the charging lid into the open state when the charging lid is closed, the switch being configured to output a first signal and a second signal different from the first signal in response to user's operation when the charging lid is open. The electronic control unit may be configured to determine whether to carry out the timer charging on the basis of a signal that is output from the switch when the charging lid is open.

In the charging device, the electronic control unit may be configured to control the charger so as to carry out the timer charging when the switch is not operated while the charging lid is open, and the electronic control unit may be configured to control the charger so as to disable setting of the timer charging and carry out instant charging when the switch is operated for the first time while the charging lid is open.

In the charging device, the electronic control unit may be configured to control the charger so as to disable setting of the timer charging and carry out instant charging when the switch is not operated while the charging lid is open, and the electronic control unit may be configured to control the charger so as to set the timer charging and carry out the timer charging when the switch is operated for the first time while the charging lid is open.

The charging device may further include an information device configured to provide information about the open/ close state of the charging lid in synchronization with the switch when the charging lid is opened or closed.

According to the invention, it is possible to increase the possibility that a failure on timer setting for charging is realized and to switch between enabled and disabled states of a timer in the flow of charging operation without any troublesome burden on a user.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8 is a table that shows a state of the switch, applied in step S3 in FIG. 6, and a determination result as to timer setting;

FIG. 13 is a table that shows a state of the switch, applied in step S24 in FIG. 12, and a determination result of a lid state;

FIG. 14 is a table that shows a state of the switch, applied in step S23 in FIG. 12, and a determination result as to timer setting;

FIG. 18 is a flowchart for illustrating how the ECU uses the switch in different ways according to the third embodiment;

FIG. 19 is a table for illustrating a vehicle state and an operation at the time when the switch is operated according to the third embodiment;

FIG. 21 is a table for illustrating a state of the switch and an operation at the time when the switch is operated according to the fourth embodiment.

DETAILED DESCRIPTION OF EMBODIMENTS

Figure 1:
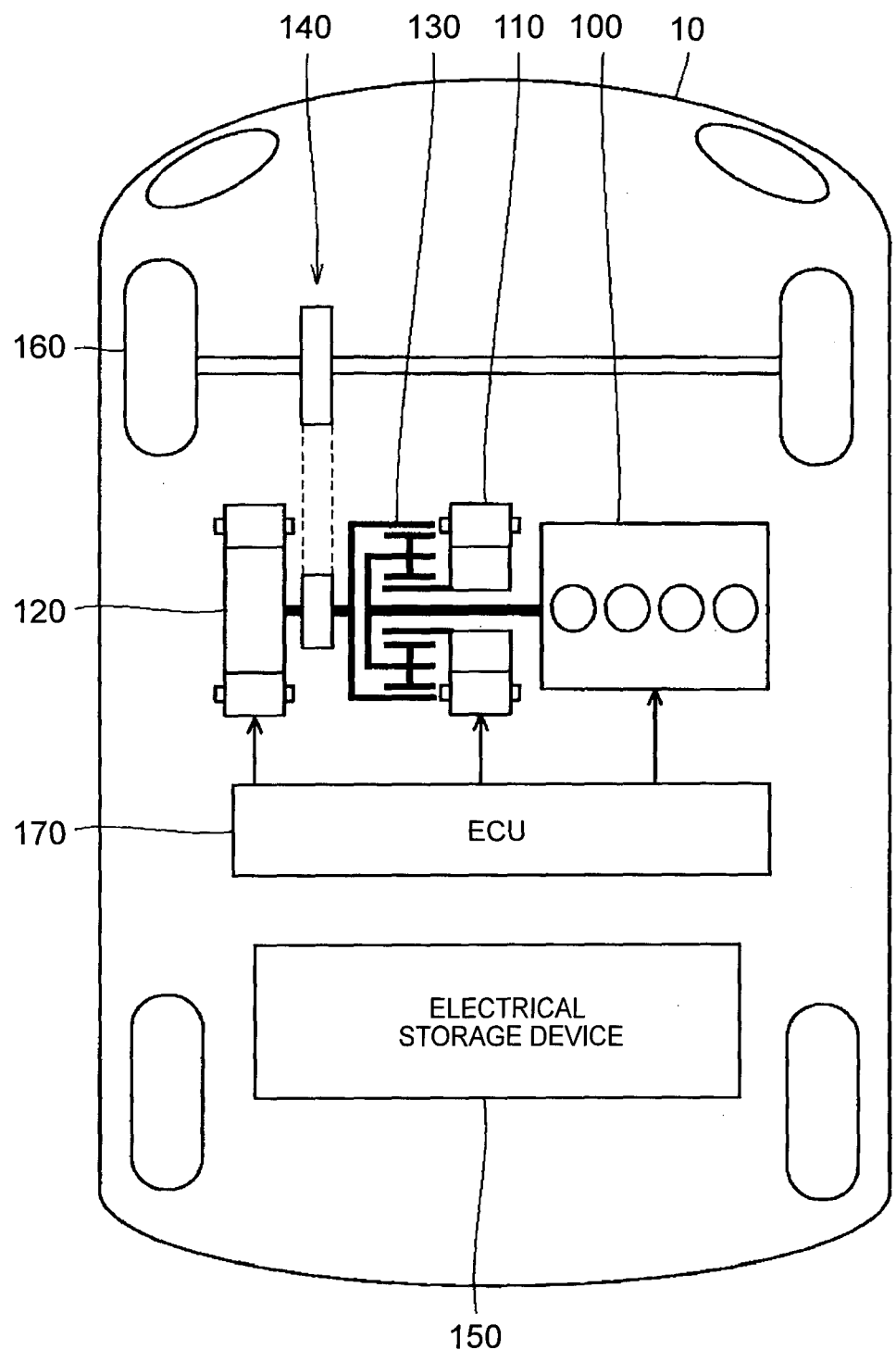
FIG. 1 is an overall block diagram of a hybrid vehicle that is shown as an example of a vehicle according to an embodiment of the invention.

Hereinafter, embodiments of the invention will be described in detail with reference to the accompanying drawings. Like reference numerals denote the same or corresponding components in the drawings, and the description thereof will not be repeated.

First, the configuration of an externally chargeable vehicle according to a first embodiment will be described. FIG. 1 is an overall block diagram of a hybrid vehicle that is shown as an example of the vehicle according to the embodiment of the invention. In the following description, the hybrid vehicle may be simply referred to as "vehicle". In addition, the hybrid vehicle is illustrative. The invention is also applicable to an electric vehicle, a fuel-cell vehicle, and the like, as long as an electrical storage device is mounted on the vehicle and the vehicle is configured to be chargeable from a device outside the vehicle.

As shown in FIG. 1, the hybrid vehicle 10 includes an engine 100, a motor generator (MG) 110, an MG 120, a power split mechanism 130, a speed reduction gear 140, an electrical storage device 150, drive wheels 160 and an electronic control unit (ECU) 170.

The engine 100, the MG 110 and the MG 120 are coupled to the power split mechanism 130. The hybrid vehicle 10 travels on driving force from at least one of the engine 100 and the MG 120. Power that is generated by the engine 100 is distributed between two routes by the power split mechanism 130. That is, one of the routes transmits power to the drive wheels 160 via the speed reduction gear 140, and the other one of the routes transmits power to the MG 110.

The engine 100 is an internal combustion engine that generates power by burning fuel, such as gasoline.

The MG 110 is an alternating-current rotary electric machine, and is, for example, a three-phase alternating-current synchronous motor that includes a U-phase coil, a V-phase coil and a W-phase coil. The MG 110 generates electric power by using the power of the engine 100, which is distributed by the power split mechanism 130. For example, when the state of charge (SOC) of the electrical storage device 150 becomes lower than a predetermined value, the engine 100 is started, and electric power is generated by the MG 110. Electric power generated by the MG 110 is converted by an inverter (described later) from alternating-current power to direct-current power. The direct-current power from the inverter is adjusted in voltage by a converter (described later), and is stored in the electrical storage device 150.

The MG 120 is an alternating-current rotary electric machine, and is, for example, a three-phase alternating-current synchronous motor that includes a U-phase coil, a V-phase coil and a W-phase coil. The MG 120 generates driving force by using at least one of electric power stored in the electrical storage device 150 and electric power generated by the MG 110. The driving force of the MG 120 is transmitted to the drive wheels 160 via the speed reduction gear 140. Thus, the MG 120 assists the engine 100 or the vehicle is caused to travel by using driving force from the MG 120. In FIG. 1, the drive wheels 160 are shown as front wheels. Alternatively, rear wheels instead of the front wheels or in addition to the front wheels may be driven.

For example, during braking of the vehicle, the MG 120 is driven by the drive wheels 160 via the speed reduction gear 140, and the MG 120 operates as a generator. Thus, the MG 120 operates as a regenerative brake that converts braking energy to electric power. Electric power generated by the MG 120 is stored in the electrical storage device 150.

The power split mechanism 130 includes a planetary gear unit that includes a sun gear, pinions, a carrier and a ring gear. The pinions are in mesh with the sun gear and the ring gear. The carrier supports the pinions such that the pinions are rotatable, and is coupled to a crankshaft of the engine 100. The sun gear is coupled to a rotary shaft of the MG 110. The ring gear is coupled to a rotary shaft of the MG 120 and the speed reduction gear 140.

The engine 100, the MG 110 and the MG 120 are coupled to one another via the power split mechanism 130 formed of the planetary gear unit. Thus, the rotation speeds of the engine 100, MG 110 and MG 120 have a relationship connected by a straight line in the nomograph.

The electrical storage device 150 is a chargeable and dischargeable direct-current power supply, and, for example, includes a secondary battery, such as a nickel metal hydride battery and a lithium ion battery. Not only electric power that is generated by the MG 110 and the MG 120 but also electric power that is supplied from a power supply outside the vehicle (described later) is stored in the electrical storage device 150.

A large-capacitance capacitor may also be employed as the electrical storage device 150. The electrical storage device 150 may be any device as long as the device is an electric power buffer that temporarily stores electric power generated by the MG 110 and the MG 120 or electric power from a power supply outside the vehicle and that is able to supply the stored electric power to the MG 120. In addition, the number of electrical storage devices mounted on the hybrid vehicle 10 is not specifically limited. Thus, the plurality of electrical storage devices may be mounted on the hybrid vehicle 10. The capacitance of each of the plurality of electrical storage devices may be substantially the same or may be different from each other.

The engine 100, the MG 110 and the MG 120 are controlled by the ECU 170. The ECU 170 may be divided into a plurality of ECUs function by function.

Figure 2:
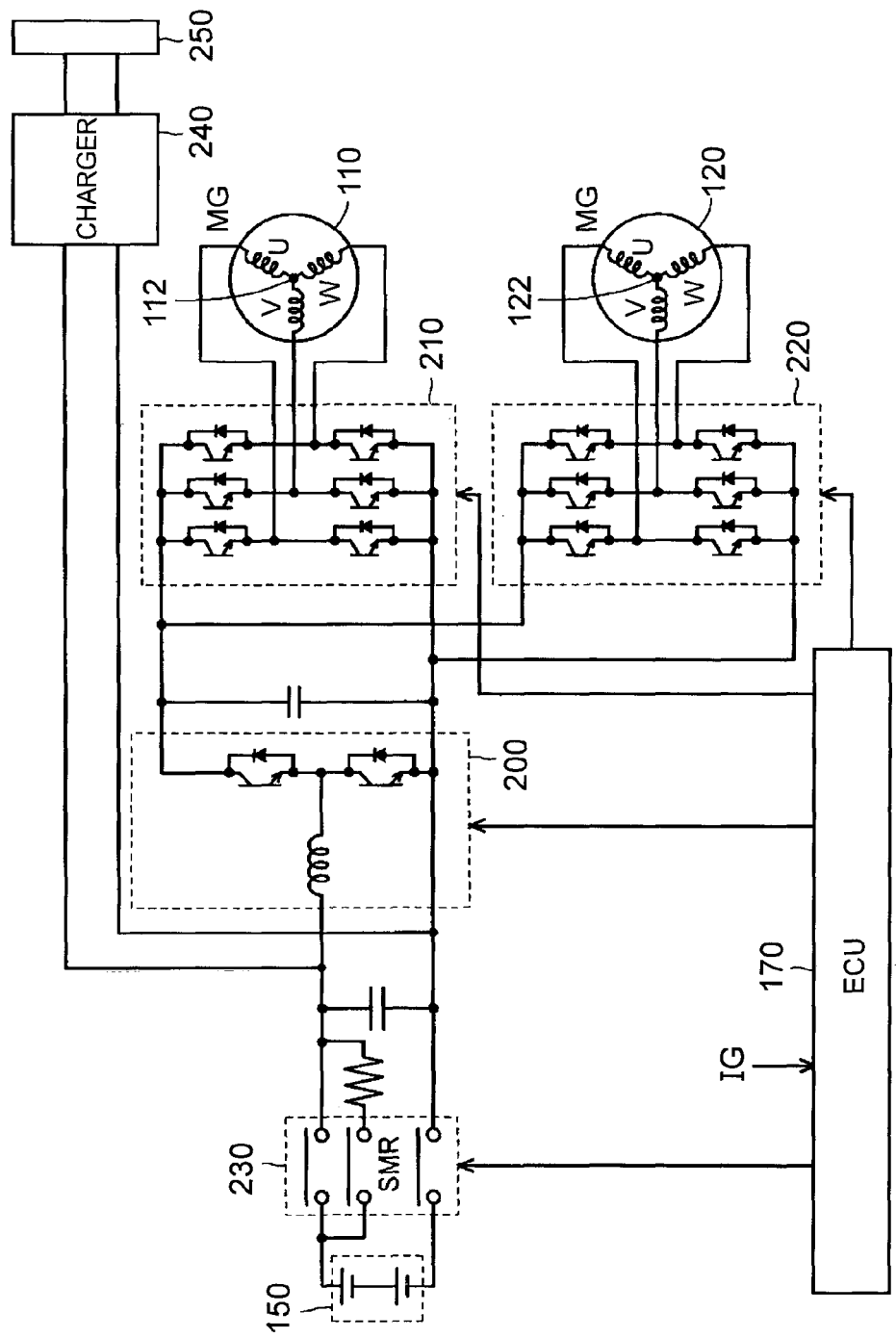
FIG. 2 is an overall configuration diagram of an electrical system for the hybrid vehicle according to the embodiment of the invention.

FIG. 2 is an overall configuration view of an electrical system of the hybrid vehicle according to the embodiment of the invention. As shown in FIG. 2, the hybrid vehicle 10 includes a converter 200, an inverter 210, an inverter 220, a system main relay (SMR) 230, a charger 240 and an inlet 250.

The converter 200 includes a reactor, two npn transistors and two diodes. One end of the reactor is connected to the positive electrode side of the electrical storage device 150, and the other end of the reactor is connected to a connection node between the two npn transistors. The two npn transistors are connected in series with each other, and each of the diodes is connected in antiparallel with a corresponding one of the npn transistors.

For example, an insulated gate bipolar transistor (IGBT) may be used as each npn transistor. In addition, instead of the npn transistor, a power switching element, such as a power metal oxide semiconductor field-effect transistor (power MOSFET), may be used.

When electric power discharged from the electrical storage device 150 is supplied to the MG 110 or the MG 120, the converter 200 steps up voltage supplied from the electrical storage device 150. On the other hand, when the electrical storage device 150 is charged with electric power generated by the MG 110 or the MG 120, the converter 200 carries out step-down operation.

Each of the inverters 210, 220 includes a U-phase arm, a V-phase arm and a W-phase arm. The U-phase arm, the V-phase arm and the W-phase arm are connected in parallel with one another. Each of the U-phase arm, the V-phase arm and the W-phase arm includes two npn transistors connected in series with each other. A diode is connected between the collector and emitter of each npn transistor, and flows current from the emitter side to the collector side.

The connection point between the two npn transistors in each arm of the inverter 210 is connected to an end portion corresponding to the arm and different from a neutral point 112 of stator coils of the MG 110. The connection point between the two npn transistors in each arm of the inverter 220 is connected to an end portion corresponding to the arm and different from a neutral point 122 of stator coils of the MG 120.

The inverter 210 converts direct current, which is supplied from the electrical storage device 150, to alternating current, and supplies the alternating current to the MG 110. In addition, the inverter 210 converts alternating current, generated by the MG 110, to direct current. The inverter 220 converts direct current, which is supplied from the electrical storage device 150, to alternating current, and supplies the alternating current to the MG 120. In addition, the inverter 220 converts alternating current, generated by the MG 120, to direct current.

The converter 200, the inverter 210 and the inverter 220 are controlled by the ECU 170.

The SMR 230 is provided between the electrical storage device 150 and the charger 240. The SMR 230 is switched between an open state and a closed state through control that is executed by the ECU 170. When the SMR 230 is in the open state, the electrical storage device 150 is electrically interrupted from the converter 200 and the charger 240. When the SMR 230 is in the closed state, the electrical storage device 150 is electrically connected to the converter 200 and the charger 240.

The inlet 250 is provided in the hybrid vehicle 10 in order to receive electric power that is supplied from an external power supply. The inlet 250 is configured to be connectable to a cable unit (not shown) for transferring electric power from the external power supply. When the inlet 250 is connected to the external power supply via the cable unit, the inlet 250 receives electric power that is supplied from the external power supply.

An output terminal of the charger 240 is connected between the electrical storage device 150 and the converter 200. The charger 240 converts alternating-current power, input to the inlet 250, to direct-current power, and supplies the direct-current power to the electrical storage device 150. When direct-current power from the charger 240 is supplied to the electrical storage device 150, the electrical storage device 150 is charged.

The ECU 170 receives a signal 1G for starting up or stopping the electrical system shown in FIG. 2. When the signal IG is in an on state, the ECU 170 starts up the electrical system. On the other hand, when the signal IG is in an off state, the ECU 170 stops the electrical system. The signal IG is transmitted from a switch (not shown), which is operated by a user, to the ECU 170. The ECU 170 allows the charger 240 to operate when the signal IG is in the off state.

Figure 3:
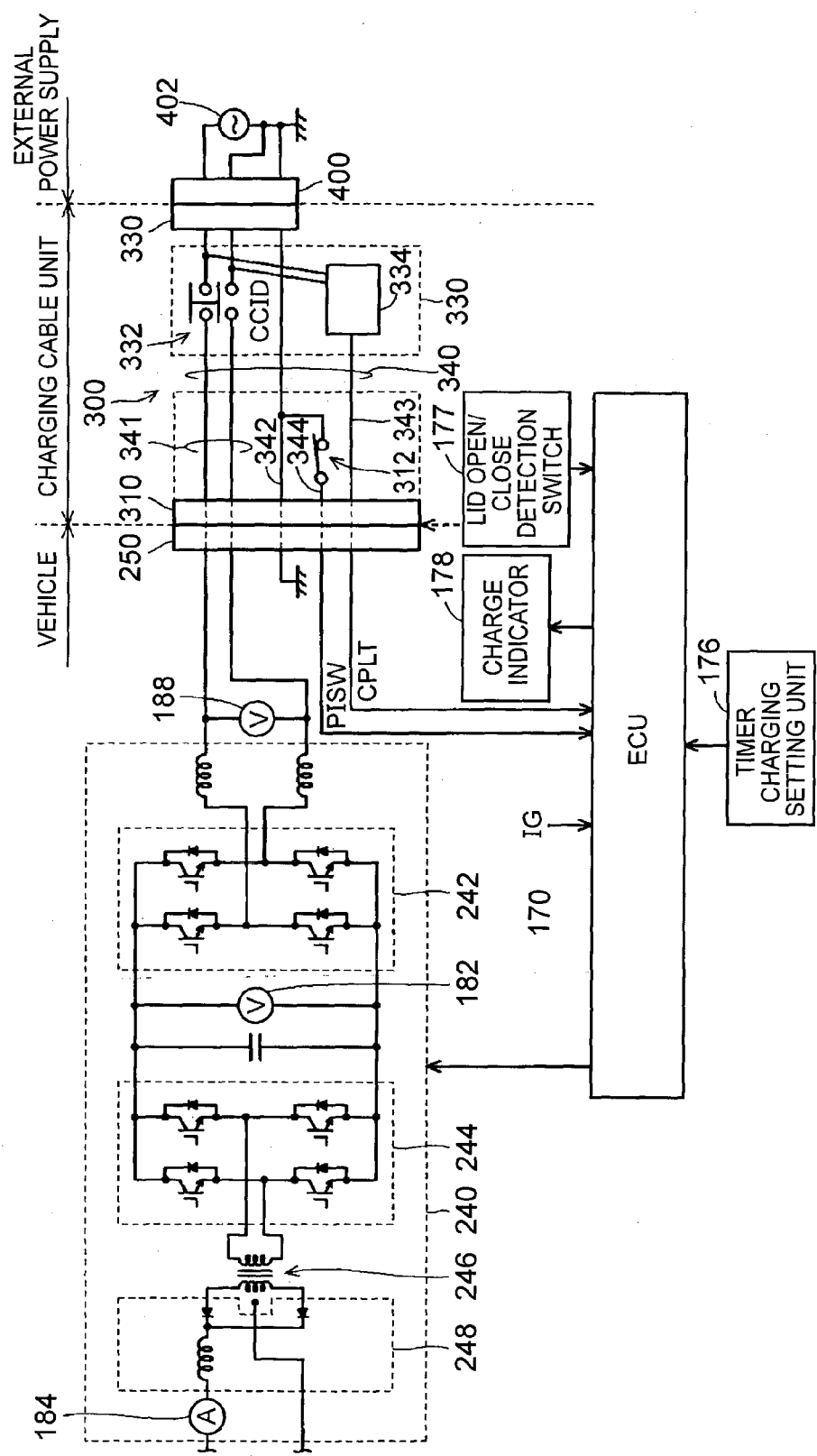
FIG. 3 is a view for illustrating a configuration for charging the hybrid vehicle from an external power supply according to the embodiment of the invention.

FIG. 3 is a view for illustrating a configuration for charging the hybrid vehicle from an external power supply according to the embodiment of the invention. As shown in FIG. 3, a charging system for charging the electrical storage device 150 of the hybrid vehicle 10 includes a charging cable unit 300, the inlet 250, the charger 240, the ECU 170, a timer charging setting unit 176, a switch 177 for detecting a lid open/close state and a charge indicator 178.

The charger 240 includes an AC/DC conversion circuit 242, a DC/AC conversion circuit 244, an isolation transformer 246 and a rectifying circuit 248.

The AC/DC conversion circuit 242 converts alternating-current power to direct-current power on the basis of a driving signal from the ECU 170. In addition, the AC/DC conversion circuit 242 functions as a step-up chopper circuit that steps up voltage by using a coil as a reactor. The DC/AC conversion circuit 244 converts direct-current power to high-frequency alternating-current power on the basis of a driving signal from the ECU 170 and outputs the alternating-current power to the isolation transformer 246.

The isolation transformer 246 includes cores, a primary coil and a secondary coil. Each core is formed of a magnetic material. The primary coil and the secondary coil are respectively wound around the cores. The primary coil and the secondary coil are electrically isolated from each other, and are respectively connected to the DC/AC conversion circuit 244 and the rectifying circuit 248. The isolation transformer 246 converts high-frequency alternating-current power, which is received from the DC/AC conversion circuit 244, to a voltage level based on the turns ratio of the primary coil and the secondary coil, and outputs the converted alternating-current power to the rectifying circuit 248. The rectifying circuit 248 rectifies alternating-current power, which is output from the isolation transformer 246, to direct-current power.

A voltage between the AC/DC conversion circuit 242 and the DC/AC conversion circuit 244 (a terminal voltage of a smoothing capacitor) is detected by a voltage sensor 182, and a signal indicating the detected result is input to the ECU 170. In addition, an output current of the charger 240 is detected by a current sensor 184, and a signal indicating the detected result is input to the ECU 170.

The ECU 170 may have not only the function of controlling the charger 240 but also the function of detecting a failure of the charger 240. For example, when the voltage that is detected by the voltage sensor 182 and/or the current that is detected by the current sensor 184 is higher than or equal to a threshold, a failure of the charger 240 has been detected.

The charging cable unit 300 is used to couple the hybrid vehicle 10 to a power supply 402. The charging cable unit 300 includes a connector 310, a plug 320, a charging circuit interrupt device (CCID) 330 and a cable 340. The cable 340 includes a power line pair 341, a ground line 342 and signal lines 343, 344.

The connector 310 is connected to the inlet 250 provided in the hybrid vehicle 10. A charging cable connection detection circuit 312 is, for example, a switch, and is provided in the connector 310. When the connector 310 is connected to the inlet 250, the switch enters the closed state, and a proximity detection signal PISW indicating a state where the connector 310 is connected to the inlet 250 is input to the ECU 170. That is, the charging cable connection detection circuit 312 is a signal generator that generates the proximity detection signal PISW.

The plug 320 is connected to an outlet 400 to which alternating-current power is supplied from the power supply 402. The outlet 400 is, for example, provided in a charging station.

The CCID 330 is inserted in the cable 340 (power line pair 341), and includes a relay 332 and a control pilot circuit 334. When the relay 332 is open, a route that supplies electric power from the power supply 402 outside the hybrid vehicle 10 to the hybrid vehicle 10 is interrupted. When the relay 332 is closed, it is allowed to supply electric power from the power supply 402 to the hybrid vehicle 10. When the connector 310 is connected to the inlet 250, the relay 332 is controlled by the ECU 170.

The control pilot circuit 334 operates on electric power that is supplied from the power supply 402 when the plug 320 is connected to the outlet 400. The control pilot circuit 334 generates a pilot signal CPLT. The pilot signal CPLT is transmitted to the ECU 170 of the vehicle via the signal line 343.

The control pilot circuit 334 oscillates the pilot signal CPLT at a prescribed duty cycle (the ratio of a pulse width to an oscillation period). The duty cycle is set on the basis of a rated current that is allowed to be supplied from the power supply 402 to the vehicle via the charging cable unit 300. The rated current is determined for each charging cable (power line pair). When the type of charging cable varies, the rated current also varies, so the duty cycle of the pilot signal CPLT also varies. The ECU 170 is able to detect the rated current, which is allowed to be supplied from the power supply 402 to the vehicle via the charging cable unit 300, by detecting the duty cycle of the pilot signal CPLT.

An alternating-current voltage of the power supply 402 is detected by the voltage sensor 188 provided inside the hybrid vehicle 10. The detected voltage is transmitted to the ECU 170.

In the present embodiment, when electric power output from the power supply 402 is supplied to the electrical storage device 150 via the charging cable unit 300, the electrical storage device 150 is charged. When the electrical storage device 150 is charged, the SMR 230 and the relay 332 in the CCID 330 are closed, and the charger 240 operates such that electric power from the power supply 402 is supplied to the electrical storage device 150.

Figure 4:
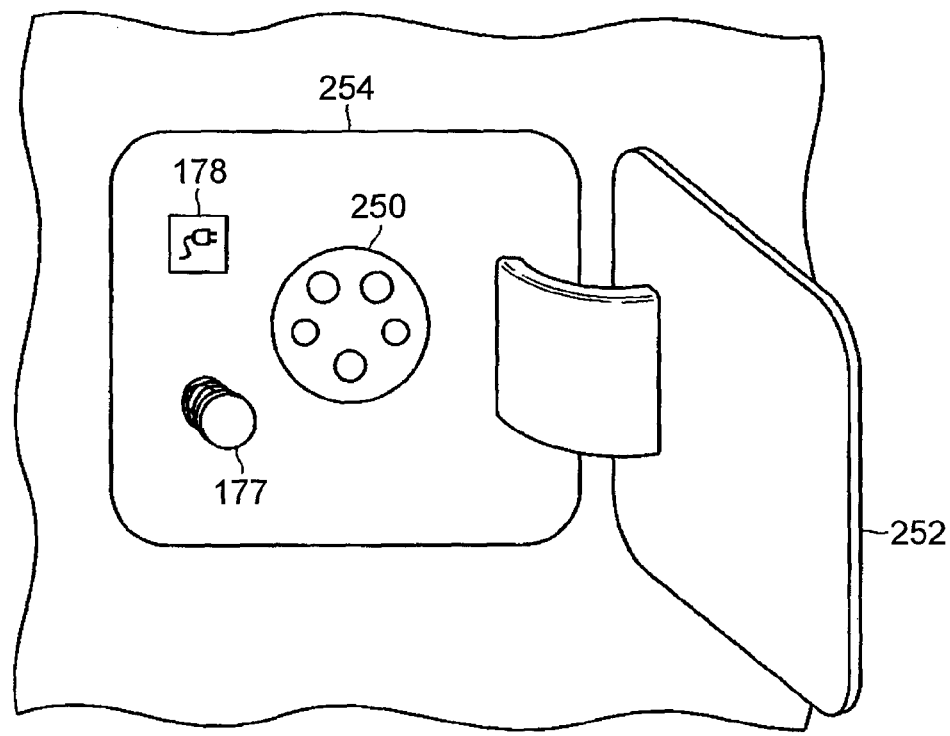
FIG. 4 is a view that shows the configuration of an inlet accommodating portion in which an inlet is accommodated in a charging device according to the embodiment.

Next, an operation regarding timer charging will be described. FIG. 4 is a view that shows the configuration of an inlet accommodating portion in which the inlet is accommodated. As shown in FIG. 4, the inlet accommodating portion 254 is normally covered with a charging lid 252 and is invisible from the outside. The inlet accommodating portion 254 accommodates the inlet 250, the charge indicator 178 and the switch 177 for detecting the lid open/close state inside the charging lid 252.

Figure 5:
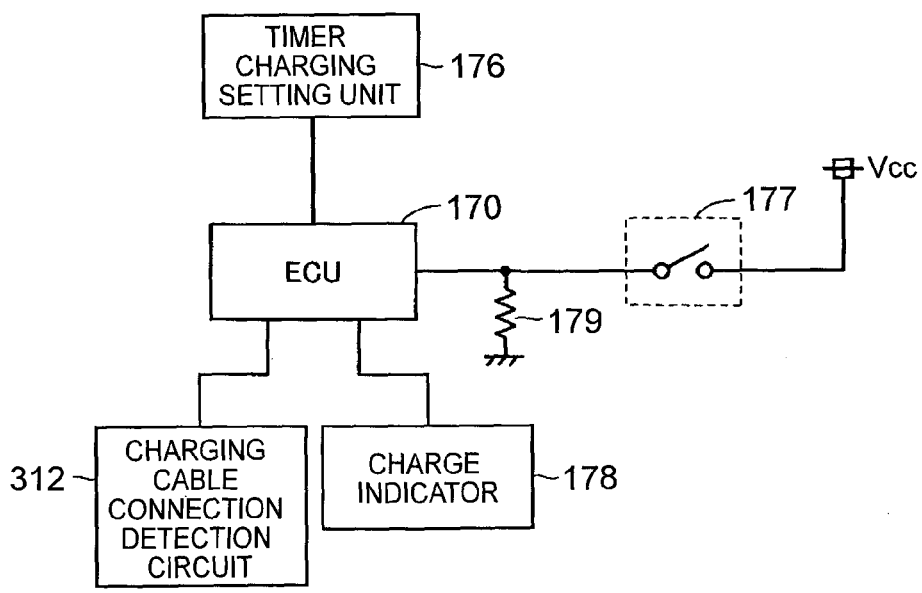
FIG. 5 is a schematic view for illustrating the relationship between a lid open/close detection switch and an ECU in the charging device according to the embodiment.

FIG. 5 is a schematic view for illustrating the relationship between a lid open/close detection switch and the ECU. As shown in FIG. 4 and FIG. 5, when the charging lid 252 is closed, the protrusion of the switch 177 is depressed by the charging lid 252. When the protrusion is in a depressed state, the switch 177 is in an off state. When the switch 177 is in the off state, a low-level detection signal is input to the ECU 170 because of a pull-down resistor 179.

When the lid is open, the protrusion of the switch 177, depressed by the charging lid 252, is released. When the protrusion is in a protruded state, the switch 177 is in an on state. When the switch 177 conducts, a power supply potential Vcc is input to the ECU 170. Thus, when the switch 177 is in the on state, a high-level detection signal is input to the ECU 170. FIG. 4 illustrates a pushbutton as the switch 177;

however, a noncontact switch, such as a proximity switch, may be used as the switch 177.

The charging cable connection detection circuit 312 is, for example, able to detect the fact that the charging cable is connected to the inlet 250 on the basis of the signal PISW or the signal CPLT, which is supplied via the inlet 250.

The timer charging setting unit 176, for example, includes an input button or a touch panel, and allows charging start time or charging end time to be input. The above timer charging setting unit 176 is desirably, for example, installed near a driver seat inside a vehicle cabin because cost increases if a waterproof component is used. For example, a touch panel of a car navigation system, a meter panel, a mobile terminal, or the like, can operate as the timer charging setting unit 176.

In contrast to this, although a location is not specifically limited as long as the charge indicator 178 can be seen at the time when the charging cable is inserted into the inlet 250. The charge indicator 178 is desirably installed near the inlet 250 so as to be easily visually recognizable from the outside of the vehicle. In addition, the protruding portion of the switch 177 for detecting a lid open/close state needs to contact the charging lid 252 when the charging lid 252 is closed, so the switch 177 is installed near the inlet 250.

Here, assuming the case where the charging cable is connected to the inlet 250 outside the vehicle in order to charge the vehicle while timer setting is erroneously set, if the timer charging setting unit 176 inside the vehicle cabin needs to be operated in order to cancel the timer setting, it is very inconvenient because the user needs to return into the vehicle cabin again.

In addition, depending on the way of user's usual usage of the vehicle, it may be assumed that operation for cancelling timer setting is rarely performed. In such a case, even when the cancelling switch has a failure, the user is hard to realize the failure, and it is presumable that the user does not find the failure until the user intends to carry out instant charging by operating the switch.

In the present embodiment, focusing on the point that the switch for cancelling timer setting is arranged at a location at which the switch is easily operated outdoor and the point that a switch that is frequently used and of which a failure is immediately easily realized also serves as the cancelling switch, the switch 177 for detecting the open/close state of the charging lid also serves as the switch for cancelling timer setting.

Figures 6, 7:
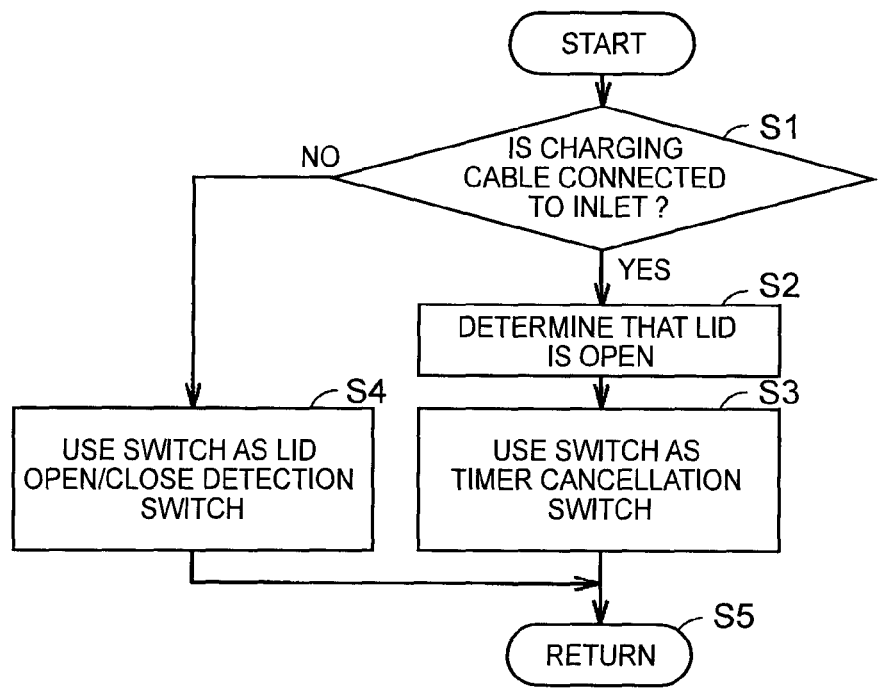
FIG. 6 is a flowchart for illustrating how the ECU uses the switch in different ways according to a first embodiment.
FIG. 7 is a table that shows a state of the switch, applied in step S4 in FIG. 6, and a determination result of a lid state.

FIG. 6 is a flowchart for illustrating how the ECU uses the switch in different ways according to a first embodiment. As shown in FIG. 4 and FIG. 6, initially, when the process is started, the ECU 170 determines in step S1 whether the charging cable is connected to the inlet 250. The ECU 170 is able to determine whether the charging cable unit 300 is connected on the basis of the state of the signal PISW or the signal CPLT shown in FIG. 3.

When it is determined in step S1 that the charging cable unit 300 is not connected to the inlet 250, the process proceeds to step S4, and the ECU 170 uses the switch 177 as the lid open/close detection switch.

FIG. 7 is a table that shows a state of the switch, applied in step S4 in FIG. 6, and a determination result of a lid state. As shown in FIG. 4 and FIG. 7, when the charging lid 252 is open, the protruding portion of the switch 177 is in the protruded state. In this case, the switch 177 is in the on state. In the example of FIG. 5, the ECU 170 receives a high-level input signal from the switch 177. Thus, the ECU 170 recognizes that the lid state is an open state when the high-level input signal is input.

On the other hand, when the charging lid 252 is closed, the protruding portion of the switch 177 is in the depressed state. In this case, the switch 177 is in the off state. In the example of FIG. 5, the ECU 170 receives a low-level input signal from the switch 177. Thus, the ECU 170 recognizes that the lid state is a closed, state when the low-level input signal is input.

Referring back to FIG. 4 and FIG. 6, when it is determined in step S1 that the charging cable unit 300 is connected to the inlet 250, the process proceeds to step S2, and the ECU 170 determines that the charging lid 252 is open. In step S3, the ECU 170 uses the switch 177 as a timer cancellation switch (instant charging start switch).

After the process of step S3 or step S4 is executed, the process proceeds to step S5, and the process returns to a main routine.

FIG. 8 is a table that shows a state of the switch, applied in step S3 in FIG. 6, and a determination result as to timer setting. As shown in FIG. 4 and FIG. 8, when the user has not operated the switch 177, the protruding portion of the switch 177 is in the protruded state. In this case, the switch 177 is in the on state. In the example of FIG. 5, the ECU 170 receives the high-level input signal from the switch 177. Thus, the ECU 170 recognizes that timer setting is enabled when the high-level input signal is input.

On the other hand, when the user has operated to depress the protruding portion of the switch 177, the protruding portion of the switch 177 is in the depressed state. In this case, the switch 177 is in the off state. In the example of FIG. 5, the ECU 170 receives the low-level input signal from the switch 177. Thus, the ECU 170 recognizes that timer setting is disabled when the low-level input signal is input. For the purpose of reducing noise in the case where, for example, the switch is accidentally touched, it is desirable that the ECU 170 accept a variation in input when the duration of the switch off state is longer than or equal to a predetermined period of time (for example, 60 ms).

In FIG. 7 and FIG. 8, the polarity of the on/off state of the switch may be inverted. In addition, in FIG. 5, the pull-down resistor 179 is provided. However, it is also applicable that a pull-up resistor is connected instead of the pull-down resistor 179 and the configuration is changed such that a ground potential is supplied instead of the power supply potential Vcc when the switch is in the on state.

When the existing switch 177 also serves as the instant charging start switch, it is possible to reduce the number of switches, so cost reduction is achieved. Furthermore, when the lid open/close detection switch arranged near the charging lid among the existing switches also serves as the instant charging start switch, it is advantageously possible to easily operate the instant charging start switch in the flow of charging operation that the charging cable unit 300 is connected to the inlet 250. Particularly, even when unintended timer setting is realized at the sight of the charge indicator 178 for indicating a state of charge during charging operation, it is possible to operate the instant charging start switch on site without returning into the vehicle cabin.

The lid open/close detection switch is invisible to the user when the charging lid 252 is closed. When the lid is open, the switch 177 is also used as the instant charging start switch and is turned on or off by user's operation, so the design of the pushbutton of the switch 177 just needs to conceive instant charging. In this way, using the lid open/close detection switch also as the instant charging start switch is a desirable combination that rarely confuses the user.

In addition, the lid is opened or closed even in normal charging operation (even when the timer is not cancelled), so on/off operation of the switch is checked for each charging operation. Thus, at the time of cancelling timer charging, it is possible to avoid a situation that instant charging cannot be carried out because of a failure of the switch.

Next, an operation in the case where the switch has a failure will be described. The case where the switch that serves as both the charging lid open/close detection switch and the timer cancellation switch, described in the first embodiment, has a failure will be considered. As shown in FIG. 5, the type of failure presumably includes a first group and a second group. The first group includes a break or ground fault of a wire harness that connects the switch 177 to the ECU 170 and a stuck-OFF failure of the switch. The second group includes a power supply short circuit of the wire harness and an stuck-ON failure of the switch 177. For the first-group failure, the input signal to the ECU 170 is fixed to a low level. For the second-group failure, the input signal to the ECU 170 is fixed to a high level.

The second-group failure is a failure that charging cannot be carried out (the timer cannot be cancelled) when charging is rapidly intended, and the disadvantage of the user is large. The first-group failure is a failure that instant charging is carried out although timer operation is intended, and the disadvantage of the user is relatively small. By using the switch having the polarity as shown in FIG. 7 and FIG. 8, it is designed to be fixed to a timer cancellation state when there is the first-group failure (having a small disadvantage) of which the frequency is higher than that of the second-group failure (having a large disadvantage). Thus, it is possible to reduce the frequency of the failure having a large disadvantage as compared to the frequency of the failure having a small disadvantage.

For the first-group failure, it is possible to detect a failure on the basis of a logical contradiction between determination as to whether the charging cable is connected and the lid state. Specifically, when the charging cable is connected while the switch 177 remains in the off state and does not change into the on state in a period from when the vehicle' stops traveling to when the charging cable is connected, the charging cable is connected although the lid is not open, so there is a contradiction. In such a case, an abnormality should be detected, and the user should be informed of the fact that the switch has a failure.

For the second-group failure, it is relatively large disadvantage when there occurs a failure, so it is desirable to actively inform the user of the failure. However, it is difficult to determine a failure as distinguished from user's operation (forgetting to close the charging lid). Because it is not possible to distinguish the second-group failure from forgetting to close the charging lid, the user is initially informed with an alarm that the charging lid is open, and, when the user continues to cause the vehicle to travel while ignoring the alarm, the possibility of a failure of the timer cancellation switch is informed, and instant charging is allowed by disabling timer setting. Thus, it is possible to avoid inconvenience that it is not possible to carry out instant charging. However, it is difficult to strictly distinguish user's operation from a failure of the switch, so it is desirable that a failure be not recorded and timer setting is recovered to the enabled state at the timing at which off operation of the switch has been recognized.

Figure 9:
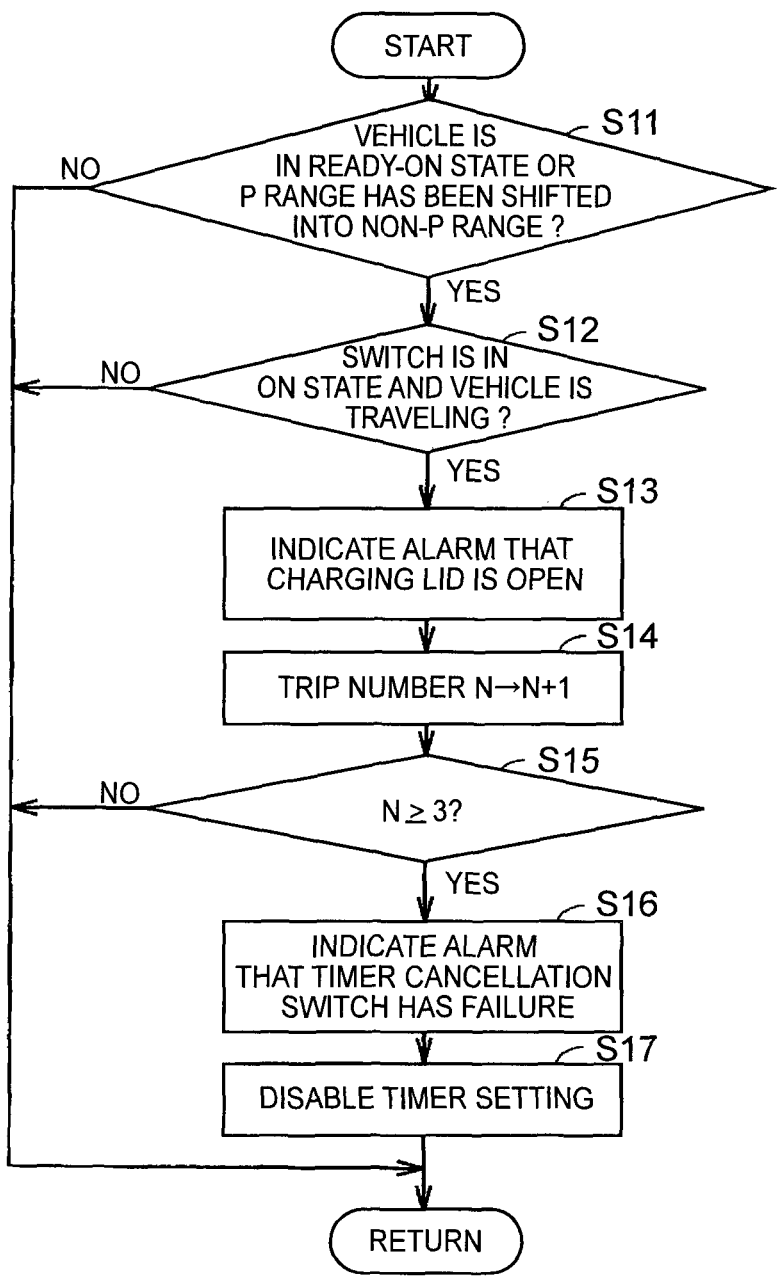
FIG. 9 is a flowchart for illustrating a process at the time when there is a second-group failure.

FIG. 9 is a flowchart for illustrating a process at the time when there is the second-group failure. As shown in FIG. 9, initially, in step S11, the ECU 170 determines whether the vehicle has been started up (ready-on state) or whether a shift range has been changed from a parking range (P range) to a non-parking range (for example, a driving (D) range and a reverse (R) range). When the vehicle has not been started up or the shift range remains in the P range in step S11, the process returns to the main routine. When the vehicle has been started up or the fact that the shift range is shifted from the P range to the non-P range has been detected in step S11, the process proceeds to step S12.

In step S12, it is determined whether the switch 177 is in the on state and the vehicle is traveling. When the condition that the switch 177 is in the on state and the vehicle is traveling is not satisfied in step S12, the process returns to the main routine; whereas, when the condition is satisfied, the process proceeds to step S13.

In step S13, the alarm that the charging lid 252 shown in FIG. 4 is open is indicated to the user. The alarm may be indicated at a display unit, or the like, which can be seen from a driver seat or may be informed by voice, an alarm sound, or the like.

Subsequent to step S13, in step S14, a trip number N in which the alarm about the open state of the charging lid 252 has been indicated is added with one. The trip number is obtained by counting the number of trips having a history that the alarm has been indicated on the assumption that one trip is from when the vehicle starts up (enters the ready-on state) to when the vehicle stops the system (enters the ready-off state). The trip number N is cleared to zero at the timing at which the fact that the switch 177 is turned off has been detected.

Furthermore, in step S15, it is determined whether the trip number N is larger than or equal to a predetermined number (for example, 3). Three times is illustrative, and the predetermined number may be increased or reduced as needed.

When N is not larger than or equal to 3 in step S15, the process returns to the main routine; whereas, when N is larger than or equal to 3, the process proceeds to step S16.

In step S16, an alarm that the timer cancellation switch has a failure is indicated to the user. The alarm may also be indicated at the display unit, or the like, which can be seen from the driver seat or may also be informed by voice, an alarm sound, or the like. In step S17, the ECU 170 disables timer setting and allows the user to carry out instant charging, and then returns the process to the main routine.

Figure 10:
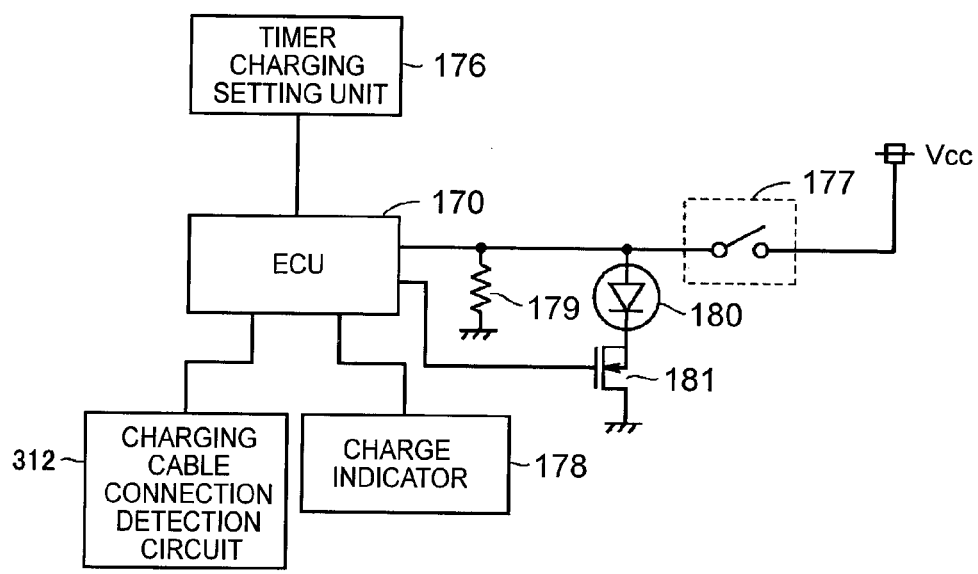
FIG. 10 is a view for illustrating a first alternative embodiment to the first embodiment.

Next, a first alternative embodiment to the first embodiment will be described. FIG. 10 is a view for illustrating the first alternative embodiment. The configuration shown in FIG. 10 includes a light-emitting diode (LED) 180 and a transistor 181 connected in series with the LED 180, in addition to the configuration shown in FIG. 5. The configuration of the other portions is similar to that of FIG. 5, so the description will not be repeated here.

The LED 180 for illuminating the inlet is provided downstream of the switch 177, which is used as both lid open/close detection and instant charging instructions, with respect to the power supply. When the switch 177 conducts, current flows from the power supply potential Vcc to the ground potential via the switch 177, the LED 180 and the transistor 181.

In addition, the ECU 170 is able to dim the LED 180 or turn off the LED 180 when the duration of lid open is long and the LED 180 has continuously turned on for a long period of time, by turning on or off the transistor 181.

By providing the LED 180 as shown in FIG. 10, it is possible to turn on or turn off the LED 180 in synchronization with the switch 177 at the time when the charging lid 252 is opened or closed. By providing an information device that provides information about the open/close state of the charging lid in synchronization with the switch at the time when the charging lid is opened or closed, it is possible to reliably inform the user of the open/close state of the charging lid.

Figure 11:
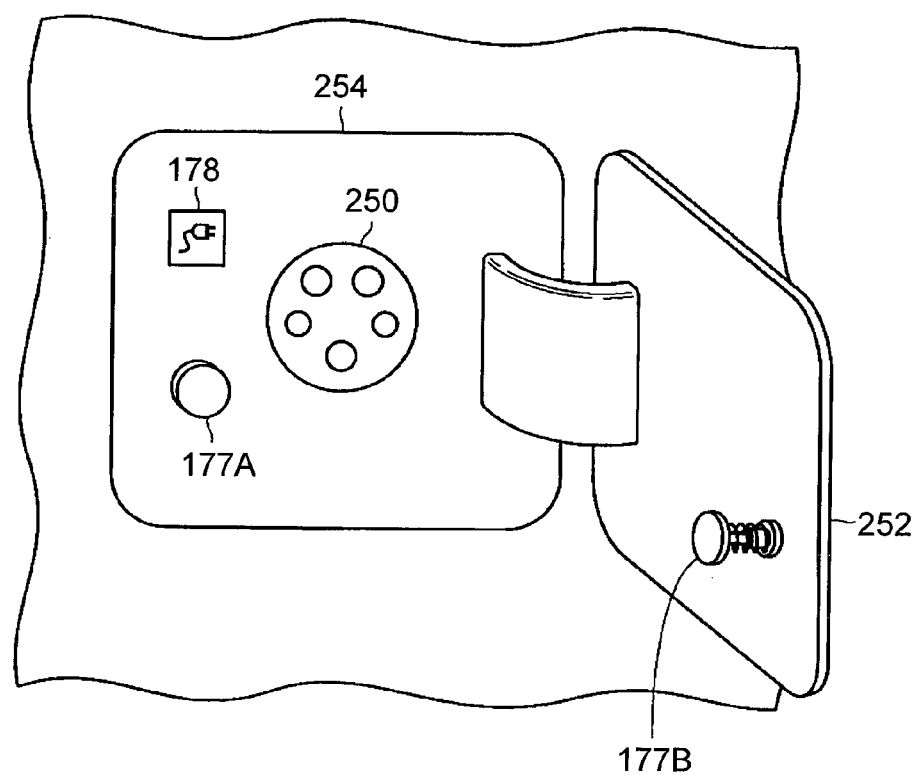
FIG. 11 is a view for illustrating a second alternative embodiment in which the shape of the switch is modified from that of the first embodiment.

Next, a second alternative embodiment to the first embodiment will be described. FIG. 11 is a view for illustrating the second alternative embodiment in which the shape of the switch is modified. The configuration shown in FIG. 11 differs from that of FIG. 4 in that a switch 177A having a shorter stroke than the switch 177 of FIG. 4 is provided and the charging lid 252 has a protrusion 177B. The configuration of the other portions in FIG. 11 is similar to that of FIG. 4, so the description will not be repeated here.

The switch 177 shown in FIG. 4 has a long stroke in order to prevent the switch 177 from erroneously entering the on state due to vibrations, or the like, during traveling. However, the switch having a long stroke has a poor appearance for a switch that is operated by a human as a pushbutton like the timer cancellation switch, and has a poor operation feel. It is desirably possible to use an ordinary pushbutton switch.

Thus, in the configuration shown in FIG. 11, an ordinary pushbutton switch having a short stroke is used as the switch 177A, and the charging lid 252 has the protrusion 177B. A cushioning material having a spring property or elasticity is connected to the protrusion 177B. When the charging lid 252 is closed, the protrusion 177B is able to continuously press the switch 177A with pressing force (urging force) larger than or equal to a predetermined value. Thus, with the use of the pushbutton switch having an ordinary stroke as well, it is possible to prevent the switch from erroneously entering the on state due to vibrations, or the like, during traveling. In this way, it is effective in reliably operating the switch to take advantage of each of the protrusion having a long depression stroke and the protrusion having a short depression stroke by allowing the protrusion to be depressed by the charging lid and allowing the depression stroke of the protrusion to be selected.

Next, a second embodiment will be described. In the first embodiment, an example in which the lid open/close detection switch is also used as the timer cancellation switch is described. In this case, the charging system is designed or set so as to carry out timer charging when the time of the timer is set unless otherwise specified.

However, it is presumable that, depending on the user, a frequency at which timer charging is carried out is low. In the second embodiment, the case where the charging system is designed or set so as not to carry out timer charging even when the time of the timer is set unless otherwise specified and so as to carry out timer charging only when operation to enable the timer is performed will be described. In such a case, a switch for enabling the timer (hereinafter, referred to as timer determination switch) is required instead of the timer cancellation switch.

The configurations shown in FIG. 4 and FIG. 5 are also the same in the second embodiment. However, the way of usage of the switch 177 regarding timer setting is different.

Figure 12:
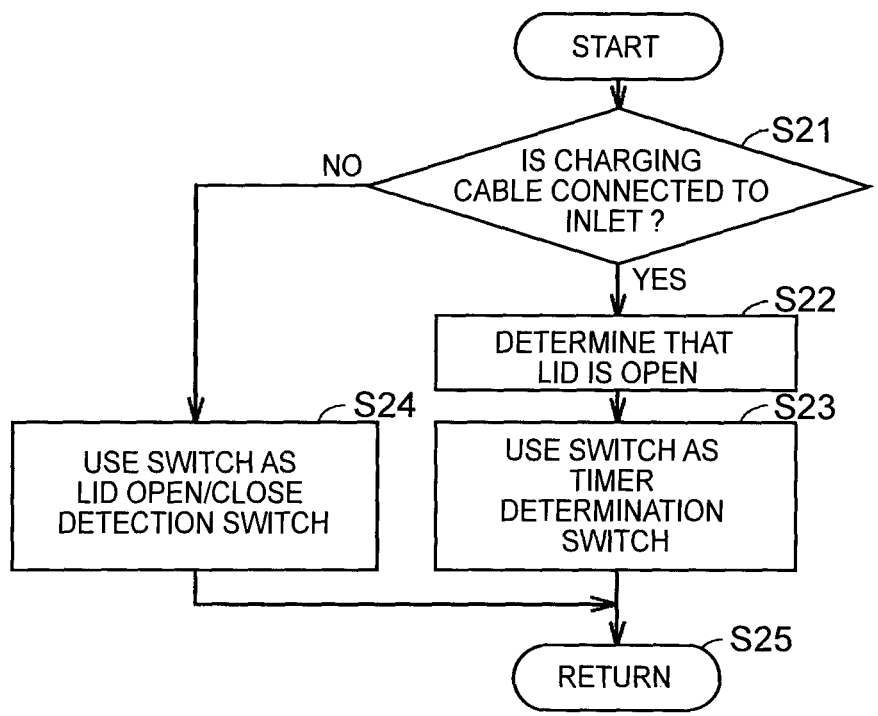
FIG. 12 is a flowchart for illustrating how the ECU uses the switch in different ways according to a second embodiment of the invention.

FIG. 12 is a flowchart for illustrating how the ECU uses the switch in different ways according to the second embodiment. As shown in FIG. 4 and FIG. 12, initially, when the process is started, the ECU 170 determines in step S21 whether the charging cable is connected to the inlet 250. The ECU 170 is able to determine whether the charging cable unit 300 is connected on the basis of the state of the signal PISW or the signal CPLT shown in FIG. 3.

When it is determined in step S21 that the charging cable unit 300 is not connected to the inlet 250, the process proceeds to step S24, and the ECU 170 uses the switch 177 as a lid open/close detection switch.

FIG. 13 is a table that shows a state of the switch, applied in step S24 in FIG. 12, and a determination result of a lid state. As shown in FIG. 4 and FIG. 13, when the charging lid 252 is open, the protruding portion of the switch 177 is in the protruded state. In this case, the switch 177 is in the on state. On the other hand, when the charging lid 252 is closed, the protruding portion of the switch 177 is in the depressed state. In this case, the switch 177 is in the off state.

Referring back to FIG. 4 and FIG. 12, when it is determined in step S21 that the charging cable unit 300 is connected to the inlet 250, the process proceeds to step S22, and the ECU 170 determines that the charging lid 252 is open. In step S23, the ECU 170 uses the switch 177 as a switch for enabling timer setting (timer determination switch).

After the process of step S23 or step S24 is executed, the process proceeds to step S25, and the process returns to a main routine.

FIG. 14 is a table that shows a state of the switch, applied in step S23 in FIG. 12, and a determination result as to timer setting. As shown in FIG. 4 and FIG. 14, when the user has not operated the switch 177, the protruding portion of the switch 177 is in the protruded state. In this case, the switch 177 is in the on state. The ECU 170 shown in FIG. 5 receives the high-level input signal from the switch 177. Thus, the ECU 170 recognizes that timer setting is disabled when the high-level input signal is input, so instant charging is carried out.

On the other hand, when the user has operated to depress the protruding portion of the switch 177, the protruding portion of the switch 177 is in the depressed state. In this case, the switch 177 is in the off state. The ECU 170 shown in FIG. 5 receives the low-level input signal from the switch 177. Thus, the ECU 170 recognizes that timer setting is enabled when the low-level input signal is input. For the purpose of reducing noise in the case where, for example, the switch is accidentally touched, it is desirable that the ECU 170 accept a variation in input when the duration of the switch off state is longer than or equal to a predetermined period of time (for example, 60 ms).

In FIG. 13 and FIG. 14, the polarity of the on/off state of the switch may be inverted. In addition, in FIG. 5, the pull-down resistor 179 is provided. However, it is also applicable that a pull-up resistor is connected instead of the pull-down resistor 179 and the configuration is changed such that a ground potential is supplied instead of the power supply potential Vcc when the switch is in the on state.

Figure 15:
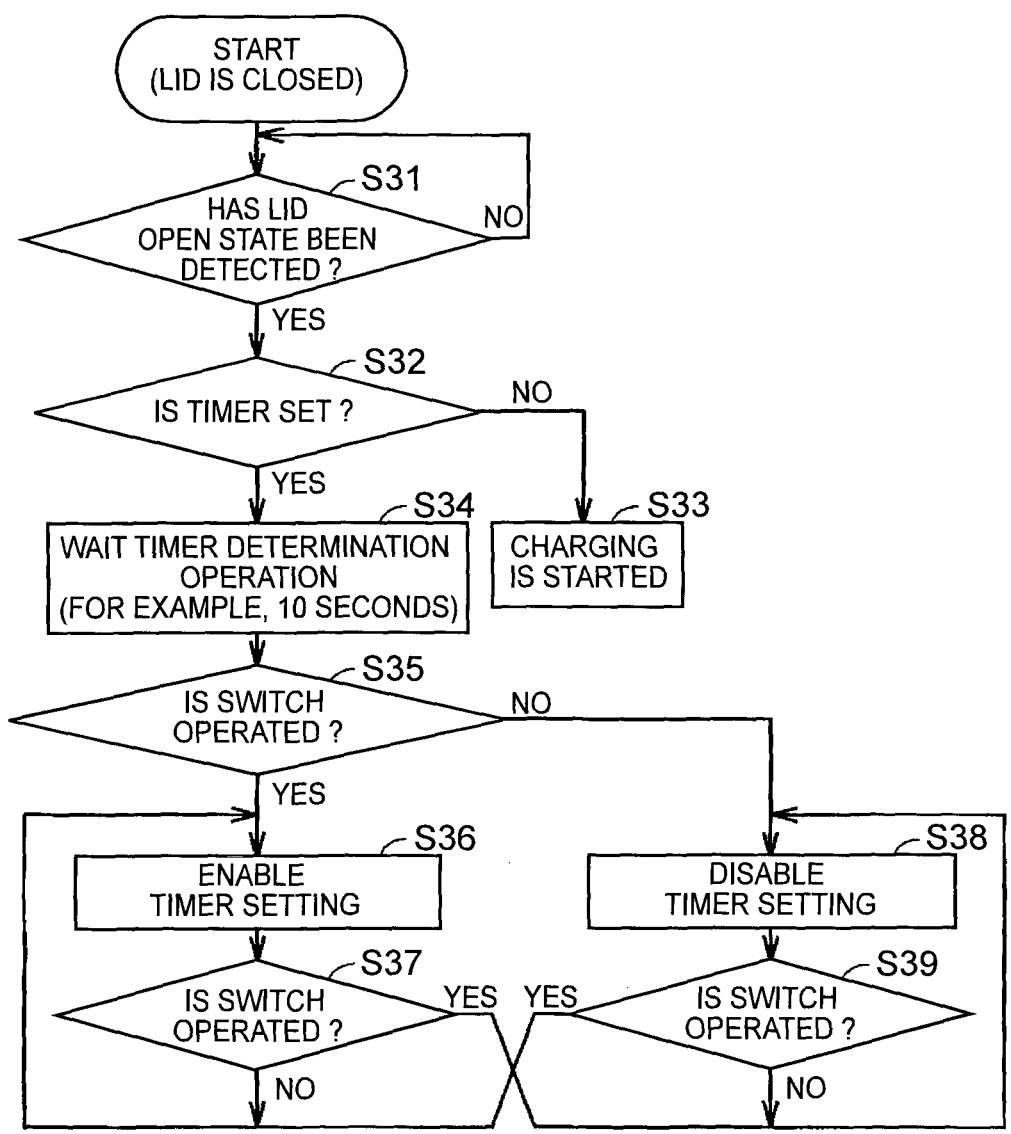
FIG. 15 is a flowchart for illustrating control for switching between enabled and disabled states of a timer according to the second embodiment.

FIG. 15 is a flowchart for illustrating control for switching between the enabled and disabled states of the timer according to the second embodiment. As shown in FIG. 15, initially, when the process is started while the charging lid 252 is closed, it is determined in step S31 whether the open state of the charging lid 252 has been detected. The ECU 170 determines the open/close state of the charging lid 252 in step S31 on the basis of the on/off state of the switch 177 and the relationship shown in FIG. 13.

While the open state of the charging lid 252 has not been detected in step S31, the process of step S31 is executed again. On the other hand, when the open state of the charging lid 252 has been detected in step S31, the process proceeds to step S32.

In step S32, the ECU 170 determines whether the charging start time of the timer has been set by the timer charging setting unit 176 shown in FIG. 5 in advance. When the timer has not been set in step S32, the process proceeds to step S33, and charging is instantly started.

On the other hand, when the charging start time of the timer has been set in step S32, the process proceeds to step S34. In step S34, timer determination operation is waited for a predetermined period of time. The predetermined period of time is, for example, 10 seconds, and may be adjusted as needed. With this waiting time, charging is not started immediately for a while when the charging cable is connected to the inlet 250 after the charging lid 252 is opened, so the number of times the relay in the charging route is operated does not need to be increased unnecessarily, and it is possible to extend the life of the relay.

Subsequently, in step S35, it is determined whether the switch 177 is operated within the predetermined period of time during which timer determination operation is waited in step S34. When the switch 177 is operated (operation from the on state to the off state) in step S35, the process proceeds to step S36, the ECU 170 enables timer setting on the basis of the correspondence relationship shown in FIG. 14, and is set in a standby state without charging until the set charging start time comes.

On the other hand, when it is determined in step S35 that the switch 177 is not operated within the predetermined period of time, the process proceeds to step S38, the ECU 170 disables timer setting, and starts instant charging when the charging cable is connected to the inlet 250.

Through the process of step S37 or the process of step S39, it is possible to switch between the enabled and disabled states of the timer by operating the switch 177 again even when the timer is set in a standby state or instant charging is being carried out.

In addition, the processes of step S35 to step S39 may be executed even when the charging cable is not connected to the inlet 250. Thus, the user may check whether the timer is in the enabled state or the disabled state with the indicator for indicating the state of charge and then connect the charging cable to the inlet 250.

In addition, when the switch 177 has a stuck-OFF failure or a stuck-ON failure, it is possible to alarm the user with a process similar to that in the case described in the first embodiment with reference to FIG. 9 and the like.

Next, a third embodiment will be described. In the first and second embodiments, an example in which the lid open/close detection switch is also used as the timer cancellation switch or the timer determination switch is described. In the third embodiment, an example in which a lid opener switch is also used as the timer cancellation switch will be described.

Figure 16:
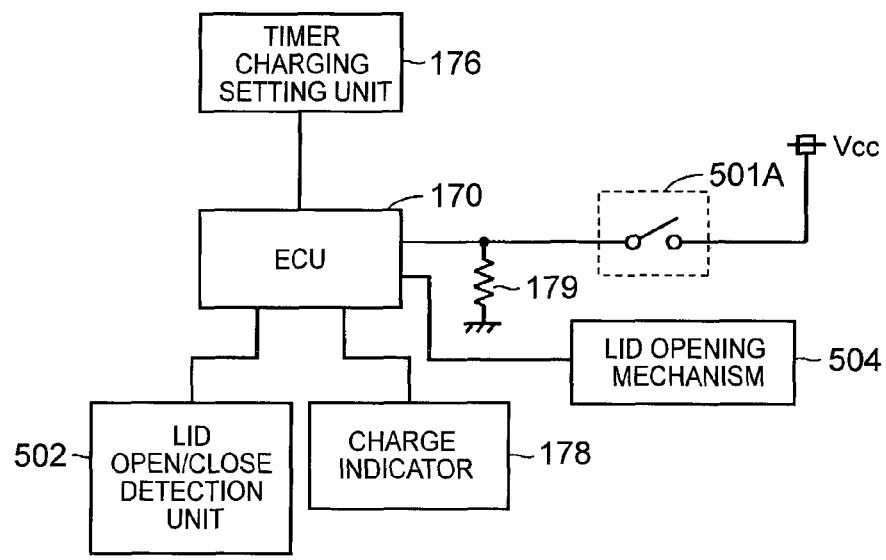
FIG. 16 is a schematic view for illustrating the relationship between a lid opener switch and the ECU according to a third embodiment of the invention.
Figure 17:
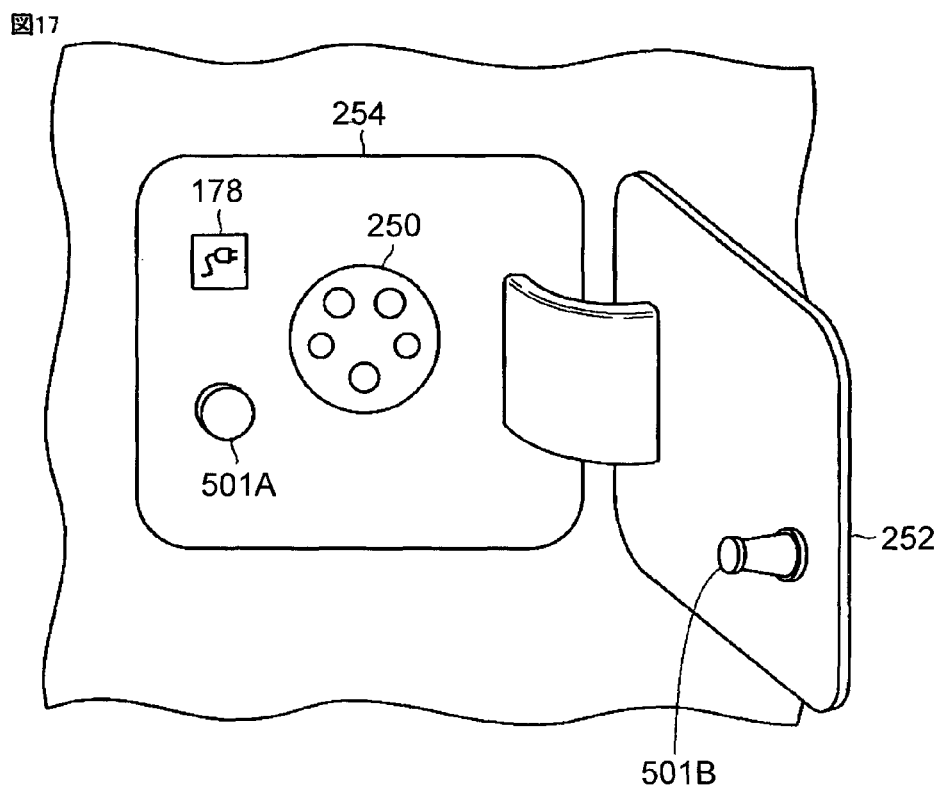
FIG. 17 is a view for illustrating an example of arrangement of the lid opener switch according to the third embodiment of the invention.

FIG. 16 is a schematic view for illustrating the relationship between the lid opener switch and the ECU. FIG. 17 is a view for illustrating an example of arrangement of the lid opener switch.

As shown in FIG. 16 and FIG. 17, when a switch 501A for opening the lid is operated, the ECU 170 changes the charging lid 252 from the closed state to the open state by driving a lid opening mechanism 504. The charging lid 252, the inlet accommodating portion 254, the inlet 250 and the charge indicator 178 shown in FIG. 17 are similar to those of FIG. 4, so the description will not be repeated. In the example of FIG. 17, the switch 501A is provided inside the inlet accommodating portion 254. When the user pushes the charging lid 252 while the charging lid 252 is closed, the switch 501A is pressed by a protrusion 501B of the charging lid 252. In this case, the ECU 170 opens the charging lid 252 with the use of the lid opening mechanism 504. For example, the lid opening mechanism 504 may be the one that unlocks a lock mechanism (not shown) for locking the charging lid 252, to which urging force is applied toward the open state, in the closed state or may be an actuator that presses the charging lid 252 in the opening direction. In addition, the lid opening mechanism 504 may be a mechanism that is mechanically unlocked or that opens the lid by operating the switch 501A without intervening the ECU 170.

FIG. 18 is a flowchart for illustrating how the ECU uses the switch in different ways according to the third embodiment. As shown in FIG. 16 and FIG. 18, initially, when the process is started, the ECU 170 determines in step S21 whether the charging cable is connected to the inlet 250. The ECU 170 is able to determine whether the charging cable unit 300 is connected on the basis of the state of the signal PISW or the signal CPLT shown in FIG. 3.

In step S51, when it is determined that the charging cable unit 300 is not connected to the inlet 250, the process proceeds to step S52; whereas, when it is determined that the charging cable unit 300 is connected, the process proceeds to step S53.

In step S52, the ECU 170 determines whether a lid open/close detection unit 502 has detected that the lid is open. In step S52, when it has been detected that the lid is open, the process proceeds to step S53; whereas, when it has been detected that the lid is closed, the process proceeds to step S55.

In step S53, it is determined that the lid is open, and, subsequently in step S54, the ECU 170 uses the switch 501A as an instant charging start switch (timer disabling switch). On the other hand, in step S55, it is determined that the lid is closed, and, subsequently in step S56, the ECU 170 uses the switch 501A as a lid opener switch.

when the way of using the switch is determined in step S54 or step S56, the process proceeds to step S57, and control is returned to the main routine.

FIG. 19 is a table for illustrating a vehicle state and an operation at the time when the switch is operated. As shown in FIG. 19, when the charging lid 252 is open in the vehicle or the charging cable is connected to the inlet 250, the ECU 170 uses the switch 501A as an instant charging start switch (timer cancellation switch).

On the other hand, when the charging lid 252 is closed in the vehicle or when the charging cable is not connected to the inlet 250, the ECU 170 uses the switch 501A as a switch for opening the lid (lid opener switch).

In the third embodiment as well, focusing on the point that the switch for cancelling timer setting is arranged at a location at which the switch is easily operated outdoor and the point that the switch also serves as a switch that is frequently used and of which a failure is immediately easily realized, the charging lid opener switch also serves as the switch for cancelling timer setting.

Thus, in the third embodiment as well, it is advantageously possible to cancel timer setting without returning into the vehicle cabin and to easily realize a failure of the switch when the switch has the failure.

Next, a fourth embodiment will be described. In the fourth embodiment, the case where the lid opener switch instead of the lid open/close detection switch according to the second embodiment is also used as the timer determination switch will be described. The configuration of the lid opener switch, shown in FIG. 16 and FIG. 17, is similar to that of the third embodiment, so the description will not be repeated.

Figure 20:
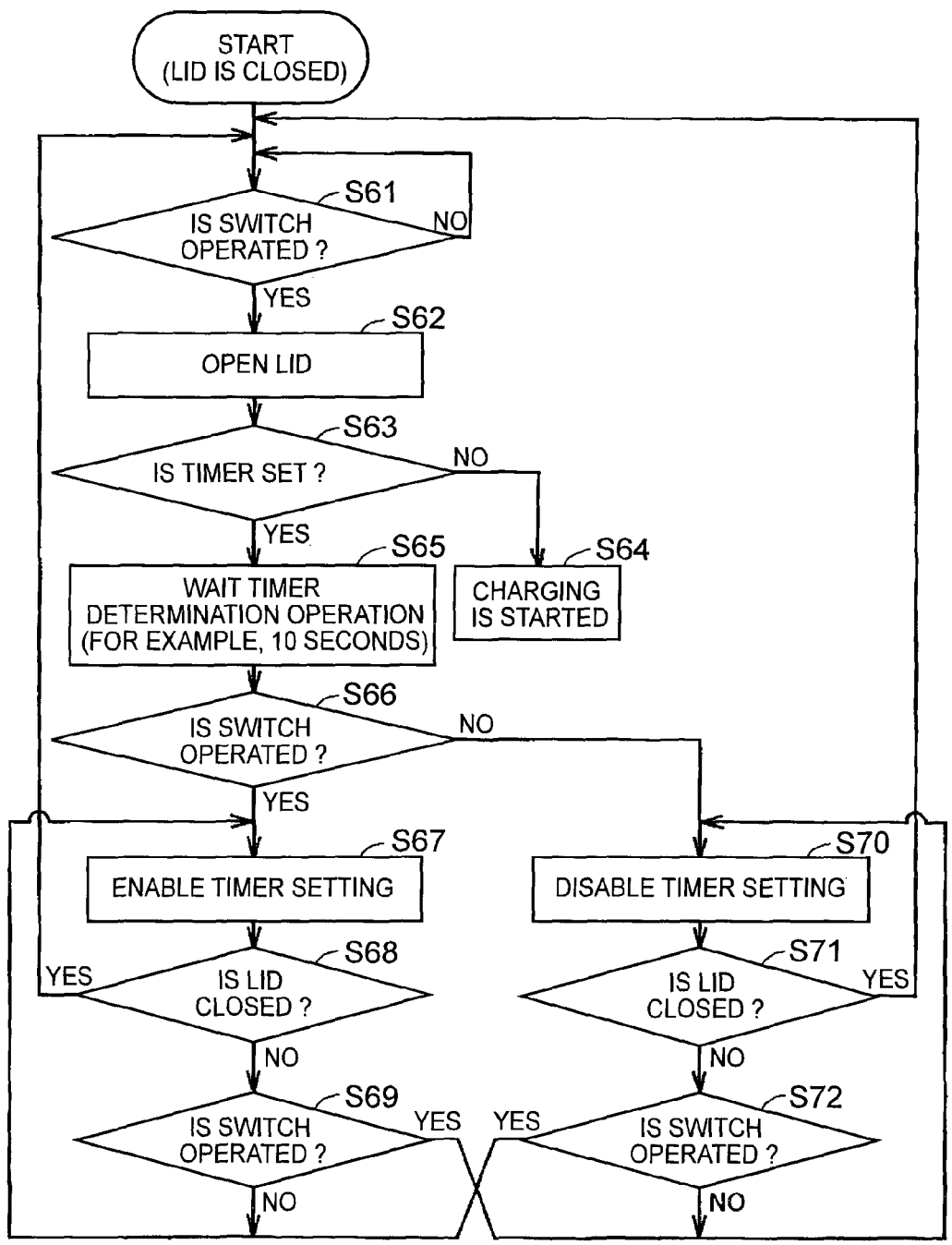
FIG. 20 is a flowchart for illustrating control for switching between the enabled and disabled states of the timer according to a fourth embodiment of the invention.

FIG. 20 is a flowchart for illustrating control for switching between the enabled and disabled states of the timer according to the fourth embodiment. As shown in FIG. 16 and FIG. 20, initially, when the process is started while the charging lid 252 is closed, it is determined in step S61 whether the switch 501A is operated. While switch operation has not been detected in step S61, the process remains in step S61, and the ECU 170 waits the switch operation.

When the switch operation has been detected in step S61, the ECU 170 opens the charging lid 252 with the use of the lid opening mechanism 504.

Subsequently, in step S63, the ECU 170 determines whether the charging start time of the timer has been set by the timer charging setting unit 176 shown in FIG. 16 in advance. When the timer has not been set in step S63, the process proceeds to step S64, and charging is instantly started.

On the other hand, when the charging start time of the timer has been set in step S63, the process proceeds to step S65. In step S65, timer determination operation is waited for a predetermined period of time. The predetermined period of time is, for example, 10 seconds, and may be adjusted as needed. With this waiting time, charging is not started immediately for a while when the charging cable is connected to the inlet 250 after the charging lid 252 is opened, so the number of times the relay in the charging route is operated does not need to be increased unnecessarily, and it is possible to extend the life of the relay.

Subsequently, in step S66, it is determined whether the switch 501A is operated within the predetermined period of time during which timer determination operation is waited in step S65. When the switch 501A is operated in step S66, the process proceeds to step S67, the ECU 170 enables timer setting on the basis of a predetermined correspondence relationship, and is set in a standby state without charging until the set charging start time comes. After that, when the charging lid 252 is closed without connecting the charging cable to the inlet 250, lid closure is detected by the lid open/close detection unit 502 in step S68, and the ECU 170 returns the process to step S61 on the basis of the detected lid closure.

On the other hand, when it is determined in step S66 that the switch 501A is not operated within the predetermined period of time, the process proceeds to step S70, the ECU 170 disables timer setting, and starts instant charging when the charging cable is connected to the inlet 250. When the charging lid 252 is closed without connecting the charging cable to the inlet 250, lid closure is detected by the lid open/close detection unit 502 in step S71, and the ECU 170 returns the process to step S61 on the basis of the detected lid closure.

Through the process of step S69 or the process of step S72, it is possible to switch between the enabled and disabled states of the timer by operating the switch 501A again even when the timer is set in a standby state or instant charging is being carried out.

In addition, the processes of step S66 to step S72 may be executed even when the charging cable is not connected to the inlet 250. Thus, the user may check the enabled or disabled state of the timer with the indicator for indicating the state of charge and then connect the charging cable to the inlet 250.

In addition, when the switch 501A has a stuck-OFF failure or a stuck-ON failure, it is possible to alarm the user with a process similar to that in the case described in the first embodiment with reference to FIG. 9 and the like.

FIG. 21 is a table for illustrating a state of the switch and an operation at the time when the switch is operated according to the fourth embodiment. As shown in FIG. 21, when the state of the switch is the on state for a predetermined period of time (for example, 60 ms) or longer, timer determination is carried out (timer setting is enabled) when the switch operates as the timer determination switch. When the state of the switch is the off state, timer setting is disabled when the switch operates as the timer determination switch.

In addition, when the state of the switch is the on state for a predetermined period of time (for example, 60 ms) or longer, the lid opening mechanism 504 is driven and the lid is opened when the switch operates as the lid opener switch. When the state of the switch is the off state, the lid opening mechanism 504 is not driven and the lid remains in the closed state when the switch operates as the timer determination switch.

In the fourth embodiment as well, focusing on the point that the switch for cancelling timer setting is arranged at a location at which the switch is easily operated outdoor and the point that the switch also serves as a switch that is frequently used and of which a failure is immediately easily realized, the charging lid opener switch also serves as the switch for enabling timer setting.

Thus, in the fourth embodiment as well, it is advantageously possible for the user who has once exited from the vehicle to enable timer setting without returning into the vehicle cabin and to easily realize a failure of the switch when the switch has the failure.

Lastly, the first to fourth embodiments will be summarized with reference to the drawings again. The charging device for the vehicle, shown in the vehicle-side configuration shown in FIG. 3, carries out timer charging in which the charging device is set in a standby state without charging until charging start time comes when the charging start time is set for the vehicle-mounted electrical storage device 150. The charging device for the vehicle includes the charger 240 that charges the electrical storage device 150 with electric power supplied from a device outside the vehicle, and the ECU 170 that determines whether to carry out timer charging or carry out instant charging without carrying out the timer charging on the basis of the state of the switch 177 (or the switch 501A) associated with the open/close state of the charging lid 252, and that controls the charger 240.

Desirably, the switch 177 is configured to be able to output a first signal (OFF) when the charging lid 252 is closed as shown in FIG. 7 and to output the first signal (OFF) and a second signal (ON) different from the first signal in response to user's operation when the charging lid 252 is open as shown in FIG. 8. As shown in FIG. 8, the ECU 170 determines whether to carry out timer charging on the basis of the signal that is output from the switch while the charging lid 252 is open (when the connector is connected).

More desirably, as shown in FIG. 4 or FIG. 11, the inlet 250 to which the charging cable unit 300 is connected is accommodated inside the charging lid 252. As shown in FIG. 6, the ECU 170 uses the switch 177 as the switch for detecting the open/close state of the charging lid 252 when the charging cable unit 300 is not connected to the inlet 250, and uses the switch 177 as the timer cancellation switch when the charging cable unit 300 is connected to the inlet 250.

More desirably, as shown in FIG. 4 or FIG. 11, the inlet to which the charging cable unit 300 is connected is accommodated inside the charging lid 252. As shown in FIG. 12, the ECU 170 uses the switch 177 as the switch for detecting an open/close state of the charging lid 252 when the charging cable unit 300 is not connected to the inlet 250, and uses the switch 177 as the timer determination switch when the charging cable unit 300 is connected to the inlet 250.

Desirably, the switch 177 is a momentary pushbutton switch. The pushbutton switch contacts the charging lid 252 into the depressed state when the charging lid 252 is closed. As shown in FIG. 4 and FIG. 11, the switch 177 is in the depression released state and in a state where the user is allowed to depress the pushbutton when the charging lid 252 is open.

Desirably, as shown in FIG. 19, the switch 501A is configured to be operated in order to shift the charging lid 252 into the open state when the charging lid 252 is closed, and to be able to output the first signal and the second signal different from the first signal in response to user's operation when the charging lid 252 is open. As shown in FIG. 20 (step 66, step S67, step S70), the ECU 170 determines whether to carry out timer charging on the basis of the signal that is output from the switch 501A while the charging lid 252 is open.

Desirably, as shown in FIG. 20 (step S66, step S67, step S70), the ECU 170 controls the charger 240 so as to carry out timer charging when the switch 501A is not operated while the charging lid 252 is open, and controls the charger 240 so as to disable setting of timer charging and carry out instant charging when the switch 501A is operated for the first time while the charging lid 252 is open.

Desirably, the ECU 170 controls the charger so as to disable setting of timer charging and carry out instant charging when the switch is not operated while the charging lid 252 is open, and controls the charger so as to enable setting of timer charging and carry out timer charging when the switch is operated for the first time while the charging lid 252 is open.

The first and second alternative embodiments described in the first embodiment may be applied to the second to fourth embodiments as well.

The invention claimed is:

1. A charging device for a vehicle, the vehicle configured to carry out timer charging in which the charging device is set in a standby state without charging until charging start time comes when the charging start time is set for a vehicle-mounted electrical storage device, the charging device comprising:
    a charger configured to charge the electrical storage device with electric power supplied from a device outside the vehicle; and
    an electronic control unit configured to determine whether to carry out the timer charging or carry out instant charging without carrying out the timer charging on the basis of a state of a switch associated with an open-close state of a charging lid, the electronic control unit being configured to control the charger.

2. The charging device according to claim 1, wherein
    the switch is configured to output a first signal when the charging lid is closed and to output the first signal and a second signal different from the first signal in response to user's operation when the charging lid is open, and
    the electronic control unit is configured to determine whether to carry out the timer charging on the basis of a signal that is output from the switch while the charging lid is open.

3. The charging device according to claim 2, wherein the switch is a pushbutton switch, and a stroke of the pushbutton switch is selectable between a long stroke and a short stroke.

4. The charging device according to claim 2, wherein
    an inlet to which a charging cable is connected is accommodated inside the charging lid,
    the electronic control unit is configured to use the switch as a switch for detecting the open-close state of the charging lid when the charging cable is not connected to the inlet, the electronic control unit being configured to use the switch as a timer cancellation switch when the charging cable is connected to the inlet.

5. The charging device according to claim 2, wherein an inlet to which a charging cable is connected is accommodated inside the charging lid,
    the electronic control unit is configured to use the switch as a switch for detecting the open-close state of the charging lid when the charging cable is not connected to the inlet, the electronic control unit being configured to use the switch as a timer determination switch when the charging cable is connected to the inlet.

6. The charging device according to claim 1, wherein
    the switch is a momentary pushbutton switch, and
    the momentary pushbutton switch is configured to contact the charging lid into a depressed state when the charging lid is closed, the momentary pushbutton switch being configured to be in a depression released state and in a state where a user is allowed to depress the momentary pushbutton switch when the charging lid is open.

7. The charging device according to claim 1, wherein
    the switch is configured to be operated in order to shift the charging lid into the open state when the charging lid is closed, the switch being configured to output a first signal and a second signal different from the first signal in response to user's operation when the charging lid is open, and the electronic control unit is configured to determine whether to carry out the timer charging on the basis of a signal that is output from the switch when the charging lid is open.

8. The charging device according to claim 1, wherein
    the electronic control unit is configured to control the charger so as to carry out the timer charging when the switch is not operated while the charging lid is open, and
    the electronic control unit is configured to control the charger so as to disable setting of the timer charging and so as to carry out instant charging when the switch is operated for the first time while the charging lid is open.

9. The charging device according to claim 1, wherein
    the electronic control unit is configured to control the charger so as to disable setting of the timer charging and so as to carry out instant charging when the switch is not operated while the charging lid is open, and the electronic control unit is configured to control the charger so as to set the timer charging and so as to carry out the timer charging when the switch is operated for the first time while the charging lid is open.

10. The charging device according to claim 1, further comprising:
    an information device configured to provide information about the open-close state of the charging lid in synchronization with the switch when the charging lid is opened or closed.

* * * * *